US012608498B2

(12) United States Patent
Lou

(10) Patent No.: US 12,608,498 B2
(45) Date of Patent: Apr. 21, 2026

(54) OBJECT MOVEMENT METHOD, APPARATUS AND ELECTRONIC DEVICE

(71) Applicant: VIVO MOBILE COMMUNICATION CO., LTD., Dongguan (CN)

(72) Inventor: Lei Lou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 61 days.

(21) Appl. No.: 18/613,785

(22) Filed: Mar. 22, 2024

(65) Prior Publication Data

US 2024/0232417 A1      Jul. 11, 2024

Related U.S. Application Data

(63) Continuation of application No. PCT/CN2022/121018, filed on Sep. 23, 2022.

(30) Foreign Application Priority Data

Sep. 24, 2021    (CN) .......................... 202111123749.1

(51) Int. Cl.
　　*G06F 21/62*　　　　(2013.01)
　　*G06F 21/60*　　　　(2013.01)
(52) U.S. Cl.
　　CPC ........ *G06F 21/6218* (2013.01); *G06F 21/602* (2013.01)
(58) Field of Classification Search
　　CPC ............... G06F 21/6218; G06F 21/602; G06F 21/6245; G06F 3/04842; G06F 3/0485
　　See application file for complete search history.

(56) References Cited

U.S. PATENT DOCUMENTS

| | | | | |
|---|---|---|---|---|
| 6,929,549 | B1 * | 8/2005 | Yamada ................. | A63F 13/12 |
| | | | | 463/42 |
| 10,530,466 | B1 * | 1/2020 | Sato ..................... | G06V 40/172 |
| 11,868,382 | B1 * | 1/2024 | Grechishkin ....... | G06F 16/3344 |
| 2012/0151224 | A1 * | 6/2012 | Koifman ................ | H04L 69/04 |
| | | | | 713/193 |
| 2016/0241895 | A1 * | 8/2016 | Mohacs ............ | H04N 21/8358 |
| 2020/0202020 | A1 * | 6/2020 | Ewing .................. | G06F 21/629 |
| 2020/0213086 | A1 * | 7/2020 | Lee ..................... | H04L 9/0825 |
| 2020/0219598 | A1 * | 7/2020 | Schneider ............. | G16H 10/60 |
| 2021/0072970 | A1 * | 3/2021 | Gupta .................. | G06Q 20/356 |
| 2021/0083843 | A1 * | 3/2021 | Salomon .............. | G06F 21/602 |
| 2022/0270723 | A1 * | 8/2022 | Schneider .............. | G06F 21/32 |
| 2023/0034967 | A1 * | 2/2023 | Nathwani ............. | G06F 3/0486 |
| 2023/0065440 | A1 * | 3/2023 | Oh .......................... | G06F 9/451 |

(Continued)

FOREIGN PATENT DOCUMENTS

| | | |
|---|---|---|
| CN | 103618955 A | 3/2014 |
| CN | 108829322 A | 11/2018 |

(Continued)

*Primary Examiner* — Meng Li
(74) *Attorney, Agent, or Firm* — The Webb Law Firm

(57) ABSTRACT

An object movement method includes receiving a first input of a user, where the first input is used to move a target object in a first space into a second space; and in response to the first input, moving the target object into the second space in a case that the second space is enabled and that a size of a residual space of the second space meets a predetermined condition, where the second space and the first space are independent of each other.

14 Claims, 3 Drawing Sheets

(56)     References Cited

U.S. PATENT DOCUMENTS

| | | | |
|---|---|---|---|
| 2023/0359324 A1 | 11/2023 | Han | |
| 2024/0170113 A1* | 5/2024 | Schneider | G06F 21/64 |
| 2024/0214485 A1* | 6/2024 | Shirai | G06F 3/011 |
| 2024/0370023 A1* | 11/2024 | Li | G06F 3/03545 |

FOREIGN PATENT DOCUMENTS

| | | | | |
|---|---|---|---|---|
| CN | 110321731 A | 10/2019 | | |
| CN | 111428223 A | 7/2020 | | |
| CN | 112558837 A | 3/2021 | | |
| CN | 112764614 A | 5/2021 | | |
| CN | 113326233 A | 8/2021 | | |
| CN | 113805752 A | 12/2021 | | |
| CN | 113868702 A | 12/2021 | | |
| CN | 114442891 A * | 5/2022 | | G06F 3/04845 |
| WO | WO-2020024518 A1 * | 2/2020 | | G06F 3/0485 |

* cited by examiner

OBJECT MOVEMENT METHOD, APPARATUS AND ELECTRONIC DEVICE

CROSS-REFERENCE TO RELATED APPLICATIONS

This application is a Bypass Continuation Application of International Patent Application No. PCT/CN2022/121018 filed Sep. 23, 2022, and claims priority to Chinese Patent Application No. 202111123749.1 filed Sep. 24, 2021, the disclosures of which are hereby incorporated by reference in their entireties.

BACKGROUND OF THE INVENTION

Field of the Invention

This application belongs to the field of communication technologies, and specifically relates to an object movement method, apparatus and electronic device.

Description of Related Art

With the continuous development of electronic information technologies, electronic devices have become a necessity that is indispensable in people's daily life. A lock screen password is usually specified for a screen of an electronic device, to ensure security of information stored in the electronic device. In this way, only when a user enters the lock screen password correctly, can the user view the information stored in the electronic device.

However, because security of the lock screen password is low, when the lock screen password is leaked, privacy information stored in the electronic device may be leaked.

SUMMARY OF THE INVENTION

Embodiments of this application aim to provide an object movement method and apparatus.

According to a first aspect, an embodiment of this application provides an object movement method. The method includes: receiving a first input of a user, where the first input is used to move a target object in a first space into a second space; and in response to the first input, moving the target object into the second space in a case that the second space is enabled and that a size of a residual space of the second space meets a predetermined condition, where the second space and the first space are independent of each other.

According to a second aspect, an embodiment of this application provides an object movement apparatus. The apparatus includes a receiving module and a processing module, where the receiving module is configured to receive a first input of a user, where the first input is used to move a target object in a first space into a second space; and the processing module is configured to: in response to the first input received by the receiving module, move the target object into the second space in a case that the second space is enabled and that a size of a residual space of the second space meets a predetermined condition, where the second space and the first space are independent of each other.

According to a third aspect, an embodiment of this application provides an electronic device. The electronic device includes a processor, a memory, and a program or instructions stored in the memory and executable by the processor, where the program or instructions, when executed by the processor, implement the steps of the method according to the first aspect.

According to a fourth aspect, an embodiment of this application provides a non-transitory readable storage medium. The non-transitory readable storage medium stores a program or instructions, and the program or instructions, when executed by a processor, implement the steps of the method according to the first aspect.

According to a fifth aspect, an embodiment of this application provides a chip. The chip includes a processor and a communication interface. The communication interface is coupled to the processor. The processor is configured to execute a program or instructions to implement the method according to the first aspect.

DESCRIPTION OF THE INVENTION

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in appropriate circumstances, so that the embodiments of this application can be implemented in other orders than the order illustrated or described herein. Moreover, the objects distinguished by "first" and "second" are usually of one type, and the quantity of objects is not limited. For example, there may be one or more first objects. In addition, in this specification and the claims, "and/or" represents at least one of connected objects, and a character "/" generally represents an "or" relationship between associated objects.

With reference to the accompanying drawings, an object movement method and apparatus, an electronic device, and a medium provided in the embodiments of this application are described below in detail by using some embodiments and application scenarios thereof.

Figure 1:
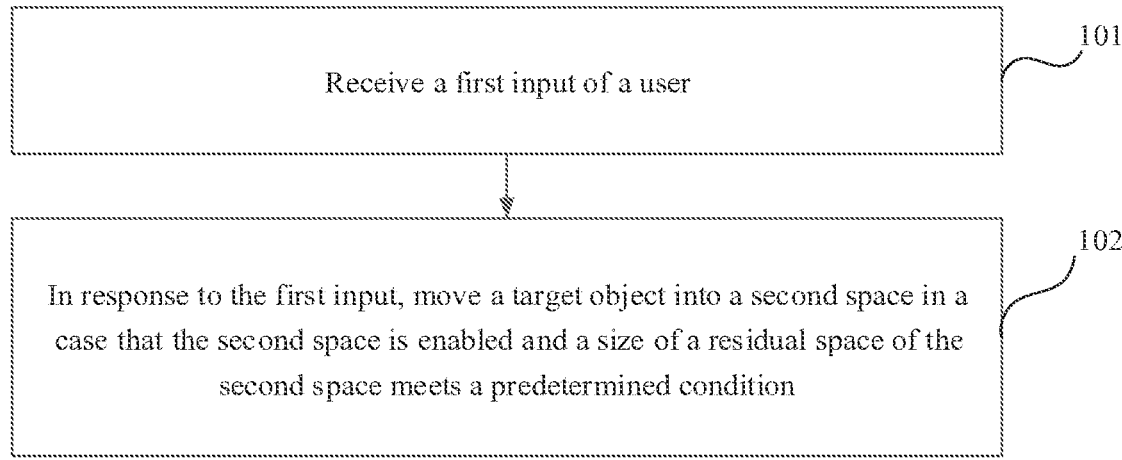
FIG. 1 is a schematic flowchart of an object movement method according to an embodiment of this application.

An embodiment of this application provides an object movement method. The object movement method may be performed by an object movement apparatus. The object movement apparatus may be an electronic device or a functional module in the electronic device. As shown in FIG. 1, the object movement method provided in this embodiment of this application may include the following step 101 and step 102.

Step 101: Receive a first input of a user.

In this embodiment of this application, the first input is used to move a target object in a first space into a second space.

Step 102: In response to the first input, move a target object into a second space in a case that the second space is enabled and that a size of a residual space of the second space meets a predetermined condition.

The second space and the first space are independent of each other. For example, the second space and the first space may be two independent storage spaces in the electronic device.

It may be understood that the second space in this embodiment of this application is a privacy space that is independent of the first space and is securer and encrypted more strictly. In addition, the first space in this embodiment of this application may be considered as a main space in the electronic device, that is, the electronic device is used for content information that does not need to be hidden.

In this embodiment of this application, content stored in the second space may be considered as information that is in the electronic device and that needs to be hidden or has a higher security level. In other words, the content stored in the second space may be considered as privacy information, for example, personal privacy information (for example, a private photo, or personal identity information), and a payment-related application.

In this embodiment of this application, because the second space is a privacy space, a key is usually set for the privacy space. The user can enable the second space only when he/she inputs the key correctly. For example, the key may be a digital key, a biometric key (such as a fingerprint), or another possible key. This is not limited in this embodiment of this application.

It should be noted that, because the second space usually stores information that needs to be hidden, and the first space does not store information that needs to be hidden, the security factor of the second space is usually greater than the security factor of the first space. To ensure the security of information stored in the second space, different keys may be set for the second space and the first space.

Optionally, in an embodiment of this application, that a size of a residual space of the second space meets a predetermined condition includes: the size of the residual space of the second space is greater than or equal to a size of the target object.

Optionally, in an embodiment of this application, step 101 includes: in a case that the second space is enabled, receiving the first input of the user for moving the target object in the first space into the second space; or receiving the first input of the user in a case that the second space is not enabled, where the first input is further used to enable the second space.

In a related process of storing privacy information, storing a file is used as an example. In this process, the user may directly store the file in a storage space. However, because the storage space is a public space, the storage space may be accessed by a third-party application. As a result, after the third-party application is attached, the third-party application may directly obtain content of the file, causing leakage of the content of the file.

According to the object movement method in this embodiment of this application, if a user wants to prevent a target object in a first space of an electronic device from being leaked, the following operation may be performed after a first input of the user for moving the target object in the first space into a second space is received: moving the target object into the second space in a case that the second space is enabled and that a size of a residual space of the second space meets a predetermined condition. Because the second space and the first space are independent of each other, the user can store the target object in the second space that is independent of the first space, so that a third-party application (such as a malicious program or a hacker) can be prevented from attacking the second space when the user is using the electronic device normally, thereby avoiding the risk that the target object is leaked.

Optionally, in an embodiment of this application, the second space may be enabled through an enabling interface of the second space. For example, in this embodiment of this application, the enabling interface of the second space may be invoked through an interface of the first space.

For example, a process of invoking the enabling interface of the second space is described below by using an example in which the interface of the first space is a privacy setting interface (it should be noted that the X space in this embodiment of this application is the second space, namely, X-SPACE in this specification).

Figure 2:
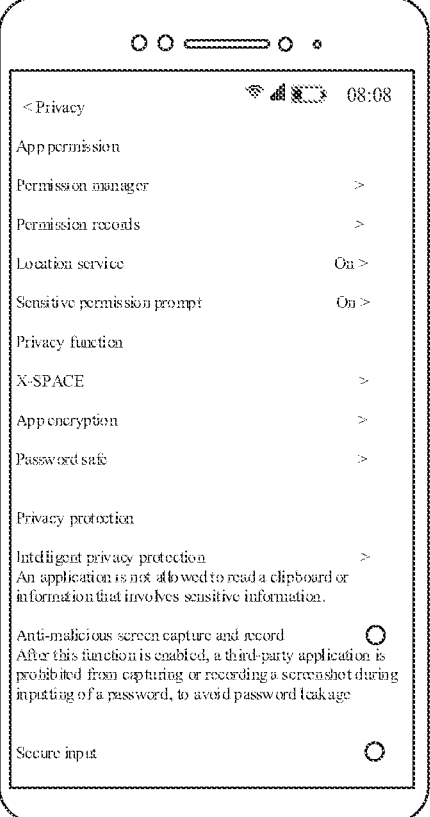
FIG. 2 is a first schematic diagram of an application interface of an object movement method according to an embodiment of this application.

As shown in FIG. 2, the interface includes a "Privacy" control. The "Privacy" control includes an "X-SPACE" control (X-SPACE is the second space). An interface for enabling X-SPACE (namely, the enabling interface of the second space) may be displayed by clicking the "X-SPACE" control. Then, a key for entering X-SPACE can be set in this interface.

With reference to FIG. 2, a homepage of X-SPACE (namely, the interface for enabling X-SPACE) may be displayed when the "X-SPACE" control is clicked for the first time (that is, in a case that X-SPACE is not enabled). The homepage includes an "Exit" control of the homepage and a "Settings" control of the homepage. A key setting interface of X-SPACE (namely, the second space) may be displayed by clicking any control or any region other than the "Exit" control of the homepage and the "Settings" control of the homepage. After a key is set, X-SPACE is in an enabled state.

In addition, if the user clicks the "Settings" control of the homepage, a settings page of "X-SPACE" may be displayed. The settings page includes a "Privacy key setting" control, a "Help" control, a "Fingerprint setting" control, a "Desktop icon verification occasion" control, a "Double-finger swipe upward on desktop to view X space" switch control, "Exit X space when screen is locked" control, and an "Hide app" control.

In addition, before a privacy key of X-SPACE is set (that is, in a case that X-SPACE is not enabled), only the "Privacy key setting" control and the "Help" control of the settings page of "X-SPACE" can be clicked. Other controls in the key setting page cannot be clicked, for example, these controls may be grayed. Help content may be displayed by clicking the "Help" control.

It should be noted that, a dynamic page for function introduction of "X-SPACE" that demonstrates a use method of "X-SPACE" may be displayed after the "X-SPACE" control is clicked for the first time. The dynamic page for function introduction includes an "Experience now" control. The homepage of X-SPACE may be displayed by clicking the "Experience now" control.

For example, in this embodiment of this application, the user may also perform a preset gesture in the first space to directly enter a decryption verification interface of the second space. For example, the "Double-finger swipe upward on desktop to view X space" switch control may be enabled. In this case, when the user swipes upward on the interface of the first space with two fingers, the decryption verification interface of the second space may be displayed. Therefore, the user can enter the second space fast and conveniently.

Optionally, in an embodiment of this application, the first input may be a touch input or another feasible input. This is not limited in this embodiment of this application.

In an example, in a case that a second interface of the second space is displayed, the first input includes an input of the user for moving the target object in the second interface into the second space.

In another example, in a case that a first interface of the first space is displayed, the first input includes an input of the user for moving the target object in the first interface into the second space. It may be understood that the first interface may be a display interface of the target object.

In another example, the first input includes a touch input of the user on a target control. For example, the target control may be a first control displayed in the second interface. The first control is configured to invoke the target object from the first space. The target control may alternatively be a second control displayed in the first interface. The second control may be configured to trigger the electronic device to move the target object into the second space. The second control may alternatively be an icon of the target object in the first interface.

Example 1: The first control is used as an example of the target control. If the user wants to move a privacy picture into X-SPACE (namely, the second space), the user controls the electronic device to display the first control after the second space is entered. After the user clicks a "Picture" control (that is, performs the first input), the electronic device is enabled to invoke the privacy picture in a picture application corresponding to the "Picture" control in the first space, so that the privacy picture is moved into X-SPACE.

Figure 3:
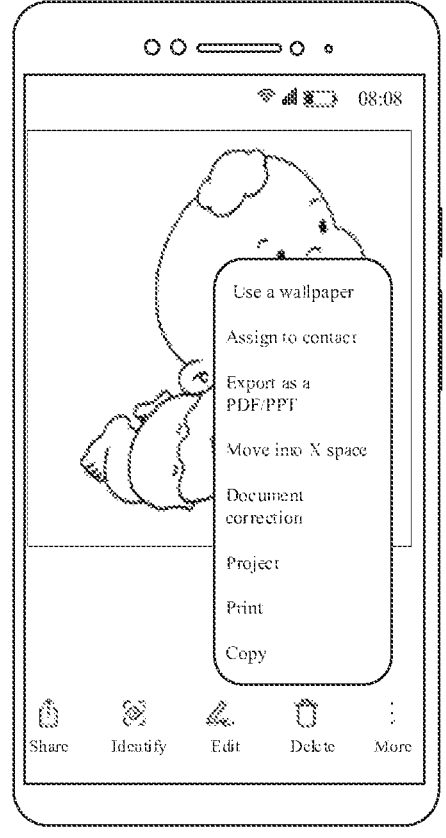
FIG. 3 is a second schematic diagram of an application interface of an object movement method according to an embodiment of this application.

Example 2: A preview interface of a privacy picture is used as an example of the first interface. As shown in FIG. 3, if the user wants to move the privacy picture into X-SPACE (namely, the second space), the user may click a "Move into X space" control (namely, the second control) in the preview interface, where the click input is the first input, so that the privacy picture is moved into X-SPACE.

Example 3: A main interface is used as an example of the first interface. The main interface displays a space icon corresponding to X-SPACE (namely, the second space). If the user wants to move a privacy picture into X-SPACE, the user may click an icon of the privacy picture and drag the icon to a display region corresponding to the space icon (that is, performs the first input), thereby moving the privacy picture into the second space.

According to the above three examples, the target object in the first space may be moved into the second space according to different scenario requirements of the user and by using different target controls.

It should be noted that, the space icon of the second space may be in the main interface, or may be in a sidebar, a drop-down bar, or another taskbar. This is not limited in this embodiment of this application. The example 3 is merely an example. In addition, to prevent information in the second space from being leaked and ensure privacy of the second space, in a case that there is no requirement of entering the second space, an icon of the second space may be in a hidden state; or in a case that there is a requirement of entering the second space, the icon of the second space may be adjusted to a displayed state by performing a preset input (for example, a slide input or another possible input, which is not limited in this embodiment of this application). After the second space is exited due to an input of the user or the second space is exited due to locking of a screen, there is currently no requirement of entering the second space. In this case, the icon of the second space is adjusted from the displayed state to the hidden state.

Optionally, in an embodiment of this application, the second space is associated with a preset application. It should be understood that, only an object that corresponds to the preset application associated with the second space can be placed into the second space, that is, an application corresponding to the target object is associated with the second space. In other words, the second space can invoke only data, in the first space, of the preset application associated with the second space. In this way, the security of the second space is improved.

Optionally, in an embodiment of this application, step 102 includes the following step:

Step 102A: In response to the first input, move the target object into the second space in a case that the second space is enabled, that the second space is decrypted successfully, and that the size of the residual space of the second space meets the predetermined condition.

It may be understood that to ensure the security of the second space, security verification of the second space needs to be performed in a process of moving the target object into the second space. The target object can be moved from the first space into the second space only when the security verification succeeds. In this way, misoperation can be avoided to solve the following problem: The target object is moved into the second space in a case that the target object does not need to be moved into the second space. As a result, user experience is affected.

For example, the decryption verification interface of the second space may be displayed before the first input is performed on the target object, so that the user may input a key in the decryption verification interface. The second space is decrypted successfully in a case that the input key is matched with a preset key. Then, the target object is moved into the second space in a case that the size of the residual space of the second space meets the predetermined condition.

For example, displaying of a decryption requirement of the second space may be triggered after the first input is performed on the target object. Then, decryption is performed on the second space.

In other words, for different movement scenarios of the target object, occasions for performing decryption verification on the second space are different.

In an example, the decryption verification interface of the second space may be displayed before the first input is received. For example, in a process of entering the second space, after decryption verification succeeds, the user may access, through a preset application icon in the second interface of the second space, a target object that is in the first space and that corresponds to the application icon; and may perform the first input on the target object in a case that the target object is displayed, so that the target object can be moved from the first space into the second space.

In an example, the first input is further used to trigger displaying of the decryption verification interface of the second space. In this way, the decryption verification interface of the second space may be displayed after the first input is received; and the target object is directly moved into the second space after decryption succeeds.

For example, in a display interface of a picture (namely, the target object) shown in FIG. 3, after the user performs the first input, that is, clicks "Move into X space" (namely, move into the second space) in the interface, displaying of a decryption verification interface of the X space (namely, the second space) is triggered. In the decryption verification interface, the user may perform fingerprint-based decryption or digital key-decryption. If the user selects to perform the digital key-decryption, the decryption exceeds after the user inputs a correct digital key. After the decryption succeeds, the picture shown in FIG. 3 is moved into the X space directly.

In an example, the user may drag a display icon of the target object into a region corresponding to an inlet control of the example, that is, the user drags the target object into a region corresponding to the icon of the second space (that is, performs the first input). Then, displaying of the decryption verification interface of the second space is triggered. After the decryption succeeds, the target object is dragged into the second space.

It should be noted that, if the second space has been enabled, the target object may be moved into the second space after decryption verification is performed on the second space directly; or if the second space has not been enabled, after the target object is moved, displaying of the enabling interface of the second space is triggered automatically, and the target object is moved into the second space directly after enabling the second space is completed (that is, after setting a privacy key of the second space is completed).

Optionally, in an embodiment of this application, in a related process of storing privacy information, storing a file is used as an example. In this process, the file is encrypted to prevent content of the file from being leaked; and then, the encrypted file is stored in a storage space. However, because the storage space is a public space, a third-party application may find the encrypted file. After the third-party application decrypts the encrypted file, the content of the file is leaked.

For example, "move the target object into the second space" in step 201 may include the following steps 102A1 and 102A2, to avoid the risk that encrypted privacy information is leaked.

Step 102A1: The object movement apparatus encrypts the target object in a target encryption manner matched with an object type of the target object.

Step 102A2: The object movement apparatus moves the encrypted target object into the second space, and deletes the unencrypted target object in the first space.

It should be understood that encryption manners for target objects of different object types are different.

For example, in a case that the object type of the target object meets the preset condition, the object movement apparatus may use a first encryption manner to encrypt the target object; or in a case that the object type of the target object does not meet the preset condition, the object movement apparatus may use a second encryption manner to encrypt the target object. For example, that the type of the target object meets the preset condition includes: the object type of the target object is text file. In other words, if the object type of the target object is text file, the object movement apparatus may use the first encryption manner to encrypt the target object; or if the object type of the target object is non-text file, the object movement apparatus may use the second encryption manner to encrypt the target object.

For example, in this embodiment of this application, the full text of the target object may be encrypted to ensure an encryption effect. In addition, in this embodiment of this application, a part of content of the target object (for example, a file header) may alternatively be selected for encryption, to take both encryption efficiency and an encryption effect into consideration.

For example, the first encryption manner includes an encryption manner 1 or an encryption manner 2. For example, the encryption manner 1 is encrypting the full text of the target object; and the encryption manner 2 is partially encrypting the target object.

In an example, the encryption manner 2 may include the following steps: Step 1: The object movement apparatus backs up a first preset quantity of bytes of content of the target object. Step 2: The object movement apparatus encrypts the first N bytes of original content of the target object. Step 3: The object movement apparatus performs cyclic XOR on subsequent content of the original content of the target object by using the backup obtained in step 1, to delete a plaintext header of the backup.

In an example, in a case that a size of content of the target object is less than or equal to the preset quantity of bytes, the encryption manner 1 is used to encrypt the full text of the target object.

In another example, in a case that the size of the content of the target object is greater than the preset quantity of bytes, the encryption manner 2 is used to encrypt the target object.

For example, the second encryption manner includes an encryption manner 1 or an encryption manner 3. For example, the encryption manner 1 is encrypting the full text of the target object; and the encryption manner 3 is encrypting the first M bytes of the content of the target object.

In an example, in a case that a size of content of the target object is less than or equal to the preset quantity of bytes, the encryption manner 1 is used to encrypt the full text of the target object.

In another example, in a case that the size of the content of the target object is greater than the preset quantity of bytes, the encryption manner 3 is used to encrypt the target object.

It should be noted that, the N bytes or the M bytes may be bytes where a file header is. For example, the preset quantity of bytes is 4 k (namely, N or M is 4096).

For example, the object movement apparatus may encrypt the target object through a TEE interface.

It should be noted that, if the target object is a picture or a video, after the object movement apparatus first generates a thumbnail of the target object, and then determines whether a size of the thumbnail is greater than the preset quantity of bytes.

It should be noted that, after encrypting the target object is completed, the encrypted target object is moved into the second space, and the unencrypted target object is deleted from the first space. In this way, the following problem can be avoided: A third-party application attacks the first space, causing leakage of the content of the target object.

Optionally, in an embodiment of this application, when a first object in the second space needs to be moved into the first space, decryption needs to be performed. The decryption may use a decryption manner corresponding to the foregoing encryption manner. A decryption process is obtained by reversing an encryption process. The first object can be moved from the second space into the first space only after the decryption succeeds.

For example, the object movement apparatus selects, from the second space, the first object that needs to be moved from the second space into the first space, and then selects a directory (which reuses the logic of a file safe) from which the first object needs to be removed. In a case that it is determined that the first object has been moved out, the object movement apparatus marks an initialized transaction success as false. In a case that a residual space of the first space is large enough, the object movement apparatus creates a temporary file in a target directory (namely, the directory from which the first object is moved), reads an encrypted file header, obtains content (smaller than or equal to 4 k) of an encrypted portion, and then invokes TEE decryption data. If calculated hash of the decryption data is the same as that in a database via comparison, the object movement apparatus writes the calculated hash into the temporary file. In a file type of the temporary file is text, data XOR is performed by using a decryption plaintext and a subsequent encryption file, a result is written in the temporary file (append), and moving out succeeds; or if the file type is non-text, subsequent encryption file data is written into the temporary file (append), and moving out succeeds.

Optionally, in an embodiment of this application, after step 102, the solution provided in this embodiment of this application further includes the following step 103.

Step 103: The object movement apparatus clears all background application data in the second space in a case that the second space is exited.

For example, in the second space, after an application in the second space is run, application data corresponding to the application is generated in a background. If the second space is exited, the object movement apparatus clears all background application data of the application in the second space. In this way, the following problem can be avoided in a case that the second space is exited: Application data of a first application running in the background is leaked.

Optionally, in an embodiment of this application, after step 102, the solution provided in this embodiment of this application further includes the following step 104.

Step 104: In a case that a first application in the second space runs in a background, the object movement apparatus performs fuzzy processing on the first application in the background.

It may be understood that after the first application in the second space is run, the object movement apparatus generates application data of the first application in the background. In a case that the first application runs in the background, it indicates that the user may view the first application again later. The object movement apparatus performs fuzzy processing on the first application in the background, to help the user view the first application again and ensure security of data of the first application.

For example, fuzzy processing may be performed on data in a last display interface of the first application.

Optionally, in an embodiment of this application, a target application is used as an example of the target object. After the target application in the first space is moved into the second space, the object movement apparatus deletes the target application in the first space.

For example, if the target application in the first space is moved into the second space in a manner of enabling a switch control, the target application may be moved into the second space by enabling a switch control of the target application in an application list of the first space. Each application in the application list corresponds to one switch control. A switch control is enabled when the user clicks on the switch control. In this way, a corresponding application can be moved into the second space. The switch control is disenabled when the user clicks on the switch control again. In this way, the corresponding application can be moved into the first space. An application that needs to be moved can be moved conveniently and fast in the manner of enabling a switch control.

It should be noted that, in a case that an application A in the second space is not run, the application A may be in a hidden state, that is, is set as "un-installed state". When the application A in the second space needs to be run, because a system of the object movement apparatus can obtain all applications in the second space through an interface A, the application A can be invoked to run through the interface A. When the application A is enabled in the second space, the system invokes an interface B to first set the application A from a hidden state to an un-hidden state (that is, from "un-installed state" to "installed state"), and then enable an application process normally. When the application A is disenabled in the second space, the system invokes an interface C to set the application A from the un-hidden state to the hidden state. This not only meets a normal use requirement of an application, but also ensures security of privacy information. In addition, alternatively, the application A may be first set from the hidden state to the un-hidden state through the interface C; and then set from the un-hidden state to the hidden state through the interface B.

It should be noted that, the second space may include two sub-spaces. The two sub-spaces are separated logically. In this way, when the target object is moved into the second space, the second space moves, based on a type of the target object (for example, whether the type is application), the target object into a sub-space that corresponds to the type of the target object.

For example, if the type of the target object is application, the target object is moved into one of the sub-spaces; or if the type of the target object is application, the target object is moved into the other sub-space. Therefore, security of the second space is ensured. For a non-application target object, because the two sub-spaces are separated logically, the following problem can be avoided: A third-party application attacks a sub-space where the non-application target object is. Therefore, security of privacy information (namely, the target object) can be ensured.

It should be noted that, an advertisement recommending function of an application in the second space may be disenabled to avoid the following problem: The application in the second space is tracked by an advertisement recommending function of a third-party application, causing a risk that the application in the second space is leaked. For example, the second space includes an advertisement recommending switch control; and the switch control may be disenabled by default.

It should be noted that, because some applications can be used normally only after they being authorized. Therefore, normal use of a related application may be ensured by setting a blank pass. For example, if an application requests phone permissions, the application may be authorized to provide blank information, where the permissions include: always allow, provide blank information, allow this time only, and prohibit. This can not only ensure normal use of the application, but also prevent information leakage.

It should be noted that, a storage permission in the second space may be implemented by setting management and control for content to be accessed, for example, setting a range of photos that can be accessed (all photos in an album or some photos in the album), or setting privacy information of a photo to be accessed, for example, a location where the photo is taken, a model of an electronic device by which the photo is taken, a photographing parameter, and the like.

It should be noted that, with respect to a map positioning permission, a fuzzy positioning function may be enabled to ensure security. For example, the map positioning permission may be authorized for enabling fuzzy positioning by default.

It should be noted that, the object movement apparatus may be a blacklist permission application. Generally, the blacklist permission application is a third-party application different from a system application.

For example, the system of the object movement apparatus may invoke an interface D to add an app identifier (for example, app id). If the added app id has a blacklist setting permission (that is, belongs to an app id of the third-party application), the app id is added into a blacklist table to complete blacklist permission setting of the app id. Then, the added app id is not allowed to access the second space.

It should be noted that, the object movement method provided in the embodiments of this application may be performed by an object movement apparatus or a control module that is in the object movement apparatus and that is configured to perform the object movement method. In this embodiment of this application, the object movement method being performed by an object movement apparatus is used as an example to describe the object movement apparatus provided in the embodiments of this application.

Figure 4:
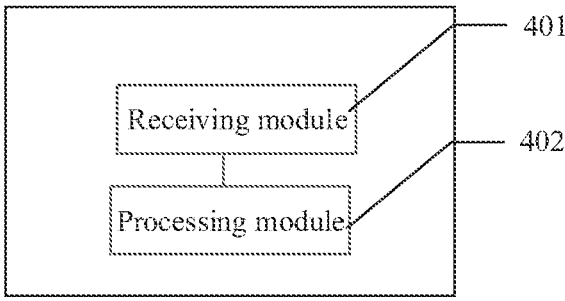
FIG. 4 is a schematic diagram of a structure of an object movement apparatus according to an embodiment of this application.

As shown in FIG. 4, an embodiment of this application provides an object movement apparatus. The apparatus includes a receiving module 401 and a processing module 402.

The receiving module 401 is configured to receive a first input of a user, where the first input is used to move a target object in a first space into a second space.

The processing module 402 is configured to: in response to the first input received by the receiving module 401, move the target object into the second space in a case that the second space is enabled and that a size of a residual space of the second space meets a predetermined condition.

The second space and the first space are independent of each other.

Optionally, in an embodiment of this application, the receiving module 401 is configured to receive the first input of the user in a case that the second space is not enabled.

The first input is further used to enable the second space.

Optionally, in an embodiment of this application, the processing module 402 is further configured to:

encrypt the target object in a target encryption manner matched with an object type of the target object; and move the encrypted target object into the second space, and delete the unencrypted target object in the first space.

Optionally, in an embodiment of this application, the processing module 402 is further configured to:

encrypt a full text of the target object in a case that a size of content of the target object is less than or equal to a preset quantity of bytes; or encrypt the first preset quantity of bytes of the target object in a case that the size of the content of the target object is greater than the preset quantity of bytes.

Optionally, in an embodiment of this application, the processing module 402 is further configured to:

clear all background application data in the second space in a case that the second space is exited.

Optionally, in an embodiment of this application, the processing module 402 is further configured to:

in a case that a first application in the second space runs in a background, perform fuzzy processing on the first application in the background.

Optionally, in an embodiment of this application, the processing module 402 is further configured to:

in a case that a first application in the second space is not enabled, set the first application to a hidden state.

According to the object movement apparatus in this embodiment of this application, if a user wants to prevent a target object in a first space of an electronic device from being leaked, after a receiving module receives a first input of the user for moving the target object in the first space into a second space, a processing module may move the target object into the second space in a case that the second space is enabled and that a size of a residual space of the second space meets a predetermined condition. Because the second space and the first space are independent of each other, the user can store the target object in the second space that is independent of the first space, so that a third-party application (such as a malicious program or a hacker) can be prevented from attacking the second space when the user is using the electronic device normally, thereby avoiding the risk that the target object is leaked.

The object movement apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in this embodiment of this application.

The object movement apparatus in this embodiment of this application may be an apparatus with an operating system. The operating system may be an Android operating system, an iOS operating system, or another possible operating system, which is not specifically limited in this embodiment of this application.

The object movement apparatus provided in this embodiment of this application can implement the processes that are implemented in the foregoing method embodiment. To avoid repetition, details are not described herein again.

Figure 5:
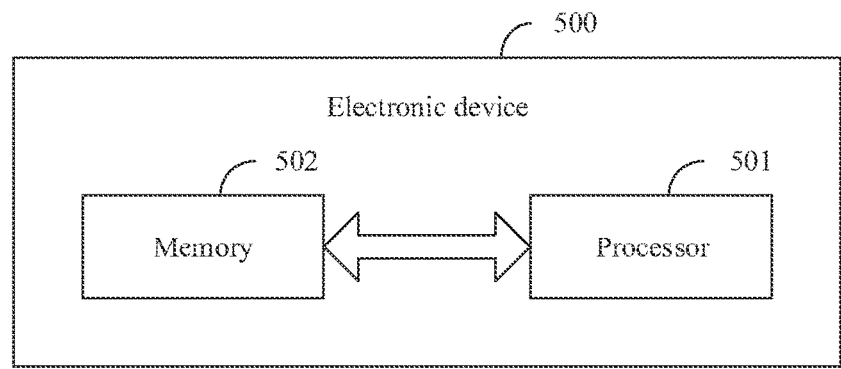
FIG. 5 is a first schematic diagram of hardware of an electronic device according to an embodiment of this application.

Optionally, as shown in FIG. 5, an embodiment of this application further provides an electronic device 500, including a processor 501, a memory 502, and a program or instructions stored in the memory 502 and executable by the processor 501. When the program or instructions are executed by the processor 501, the processes of the foregoing embodiment of the object movement method are implemented, with the same technical effects achieved. To avoid repetition, details are not described herein again.

It should be noted that the electronic device in this embodiment of this application includes the foregoing mobile electronic device and the foregoing non-mobile electronic device.

Figure 6:
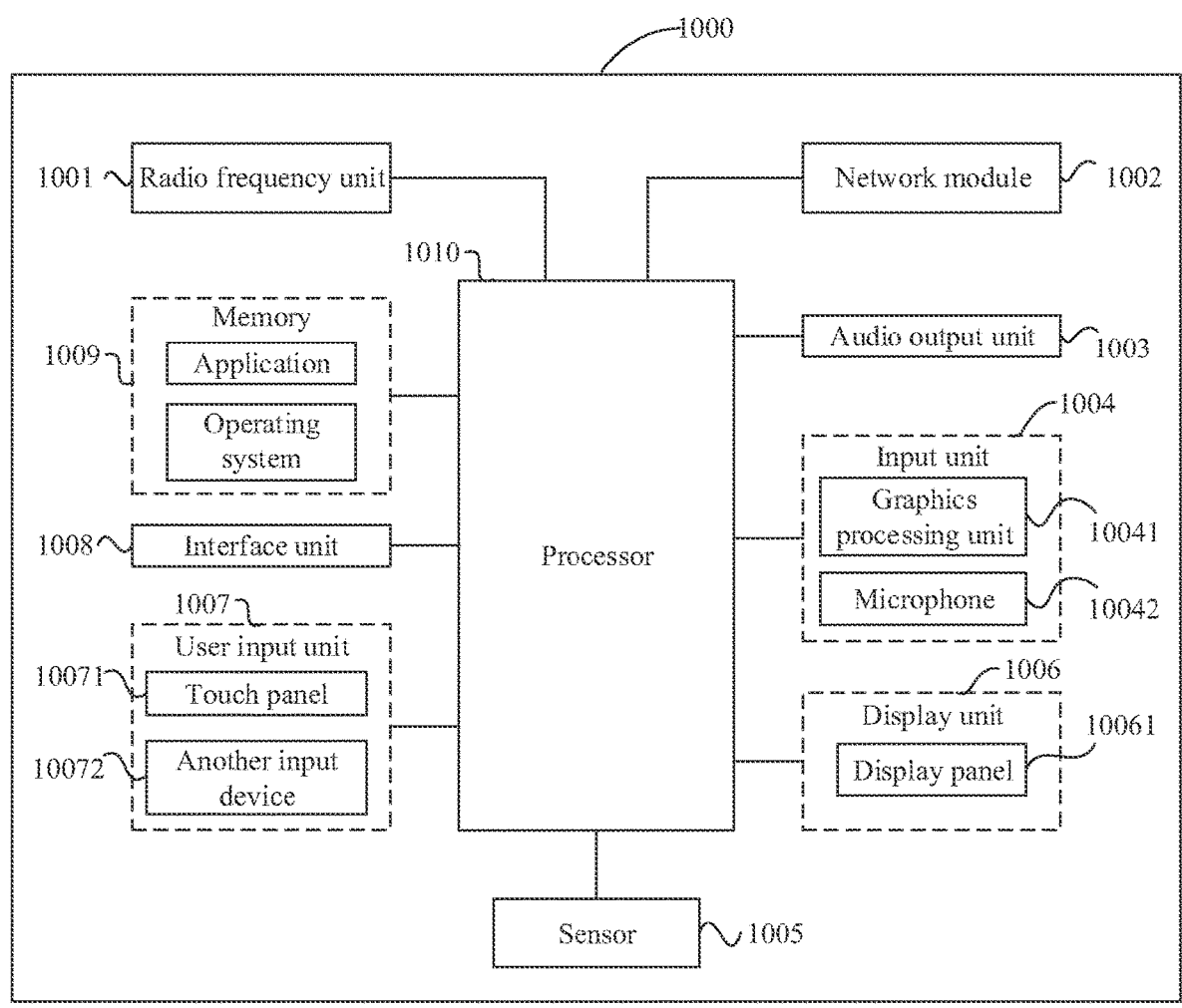
FIG. 6 is a second schematic diagram of hardware of an electronic device according to an embodiment of this application.

FIG. 6 is a schematic diagram of a hardware structure of an electronic device according to an embodiment of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

It may be understood by a person skilled in the art that the electronic device 1000 may further include a power supply (such as a battery) that supplies power to each component. The power supply may be logically connected to the processor 1010 by using a power management system, to implement functions such as charging, discharging, and power consumption management by using the power management system. The structure of the electronic device shown in FIG. 6 does not constitute a limitation on the electronic device. The electronic device may include components more or fewer than those shown in the figure, or some components may be combined, or there may be a different component arrangement. Details are not described herein.

The processor 1010 is configured to: receive a first input of a user, where the first input is used to move a target object in a first space into a second space; and in response to the first input, move the target object into the second space in a case that the second space is enabled and that a size of a residual space of the second space meets a predetermined condition.

The second space and the first space are independent of each other.

Optionally, the processor 1010 is configured to receive the first input of the user in a case that the second space is not enabled, where the first input is further used to enable the second space.

Optionally, the processor 1010 is further configured to:

encrypt the target object in a target encryption manner matched with an object type of the target object; and move the encrypted target object into the second space, and delete the unencrypted target object in the first space.

Optionally, the processor 1010 is further configured to clear all background application data in the second space in a case that the second space is exited.

Optionally, the processor 1010 is further configured to: in a case that a first application in the second space runs in a background, perform fuzzy processing on the first application in the background.

Optionally, the processor 1010 is further configured to: encrypt a full text of the target object in a case that a size of content of the target object is less than or equal to a preset quantity of bytes; or encrypt the first preset quantity of bytes of the target object in a case that the size of the content of the target object is greater than the preset quantity of bytes.

Optionally, the processor 1010 is further configured to: in a case that a first application in the second space is not enabled, set the first application to a hidden state.

After receiving a first input of a user for moving a target object in a first space into a second space, the electronic device in this embodiment of this application may move the target object into the second space in a case that the second space is enabled and that a size of a residual space of the second space meets a predetermined condition. Because the second space and the first space are independent of each other, the user can store the target object in the second space that is independent of the first space, so that a third-party application (such as a malicious program or a hacker) can be prevented from attacking the second space when the user is using the electronic device normally, thereby avoiding the risk that the target object is leaked.

It should be understood that, in this embodiment of this application, the radio frequency unit 1001 includes but is not limited to an antenna, at least one amplifier, a transceiver, a coupler, a low noise amplifier, a duplexer, and the like. The electronic device provides wireless broadband Internet access for the user by using the network module 1002, for example, helping the user to send and receive an e-mail, browse a web page, and access streaming media. The audio output unit 1003 may include but is not limited to a speaker, a buzzer, a telephone receiver, and the like.

The input unit 1004 may include a graphics processing unit (GPU) 10041 and a microphone 10042. The graphics processing unit 10041 processes image data of a static picture or a video obtained by an image capturing apparatus (for example, a camera) in a video capturing mode or an image capturing mode. The display unit 1006 may include a display panel 10061. Optionally, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional key (for example, a volume control key or a power on/off key), a trackball, a mouse, and a joystick. Details are not described herein. The memory 1009 may be configured to store a software program and various data, including but is not limited to an application program and an operating system. The processor 1010 may be integrated with an application processor and a modem processor. The application processor mainly processes an operating system, a user interface, an application program, and the like. The modem processor mainly processes wireless communication. It can be understood that, alternatively, the modem processor may not be integrated into the processor 1010.

An embodiment of this application further provides a non-transitory readable storage medium. The non-transitory readable storage medium stores a program or instructions. When the program or the instructions are executed by a processor, the processes of the foregoing embodiment of the object movement method are implemented, with the same technical effects achieved. To avoid repetition, details are not described herein again.

The processor is a processor in the electronic device in the foregoing embodiment. The non-transitory readable storage medium includes a non-transitory computer-readable storage medium, for example, a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to execute a program or instructions to implement the processes of the foregoing embodiment of the object movement method, with the same technical effects achieved. To avoid repetition, details are not described herein again.

It should be understood that the chip mentioned in this embodiment of this application may also be referred to as a system-on-chip, a system chip, a chip system, a system-on-a-chip, or the like.

It should be noted that, in this specification, the terms "include", "comprise", or any of their variants are intended to cover a non-exclusive inclusion, so that a process, a method, an article, or an apparatus that includes a series of elements includes not only those elements but also other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An object movement method, wherein the method comprises:

receiving, by an electronic device, a first input of a user, wherein the first input is used to move a target object in a first space into a second space; and in response to the first input, moving, by the electronic device, the target object into the second space in a case that the second space is enabled and that a size of a residual space of the second space meets a predetermined condition, wherein the second space and the first space are independent of each other, and the predetermined condition comprises the size of the residual space of the second space is greater than or equal to a size of the target object; and in a case that a privacy key is set for the second space, the second space is enabled; wherein the moving the target object into the second space comprises:

encrypting, by the electronic device, the target object in a target encryption manner matched with an object type of the target object; and moving, by the electronic device, the encrypted target object into the second space, and deleting, by the electronic device, unencrypted target object in the first space; and the encrypting the target object comprises:

encrypting, by the electronic device, a full text of the target object in a case that a size of content of the target object is less than or equal to a preset quantity of bytes; or encrypting, by the electronic device, a first preset quantity of bytes of the target object in a case that the size of the content of the target object is greater than the preset quantity of bytes.

2. The object movement method according to claim 1, wherein the receiving, by an electronic device, a first input of a user comprises:

receiving, by the electronic device, the first input of the user in a case that the second space is not enabled, wherein the first input is further used to enable the second space.

3. A computer program product, wherein the computer program product is executed by at least one processor to implement the object movement method according to claim 2.

4. The object movement method according to claim 1, wherein after the moving, by the electronic device, the target object into the second space, the method further comprises:

clearing, by the electronic device, all background application data in the second space in a case that the second space is exited.

5. The object movement method according to claim 1, wherein after the moving, by the electronic device, the target object into the second space, the method further comprises:

in a case that a first application in the second space runs in a background, performing, by the electronic device, fuzzy processing on the first application in the background.

6. The object movement method according to claim 1, wherein after the moving, by the electronic device, the target object into the second space, the method further comprises:

in a case that a first application in the second space is not enabled, setting, by the electronic device, the first application to a hidden state.

7. A computer program product, wherein the computer program product is executed by at least one processor to implement the object movement method according to claim 1.

8. A chip, wherein the chip comprises a processor and a communication interface, the communication interface is coupled to the processor, and the processor is configured to execute a program or instructions to implement the object movement method according to claim 1.

9. An electronic device, comprising a processor, a memory, and a program stored in the memory and executable by the processor, wherein the program when executed by the processor, causes the electronic device to perform:

receiving a first input of a user, wherein the first input is used to move a target object in a first space into a second space; and in response to the first input, moving the target object into the second space in a case that the second space is enabled and that a size of a residual space of the second space meets a predetermined condition, wherein the second space and the first space are independent of each other, and the predetermined condition comprises the size of the residual space of the second space is greater than or equal to a size of the target object; and in a case that a privacy key is set for the second space, the second space is enabled; wherein the program, when executed by the processor, causes the electronic device to further perform:

encrypting the target object in a target encryption manner matched with an object type of the target object; and moving the encrypted target object into the second space, and deleting unencrypted target object in the first space; and the program, when executed by the processor, causes the electronic device to further perform:

encrypting a full text of the target object in a case that a size of content of the target object is less than or equal to a preset quantity of bytes; or encrypting a first preset quantity of bytes of the target object in a case that the size of the content of the target object is greater than the preset quantity of bytes.

10. The electronic device according to claim 9, wherein the program, when executed by the processor, causes the electronic device to further perform:

receiving the first input of the user in a case that the second space is not enabled, wherein the first input is further used to enable the second space.

11. The electronic device according to claim 9, wherein the program, when executed by the processor, causes the electronic device to further perform:

clearing all background application data in the second space in a case that the second space is exited; or in a case that a first application in the second space runs in a background, performing fuzzy processing on the first application in the background; or in a case that a first application in the second space is not enabled, setting the first application to a hidden state.

12. A non-transitory readable storage medium, wherein the non-transitory readable storage medium stores a program, and the program, when executed by a processor of an electronic device, causes the electronic device to perform:

receiving a first input of a user, wherein the first input is used to move a target object in a first space into a second space; and in response to the first input, moving the target object into the second space in a case that the second space is enabled and that a size of a residual space of the second space meets a predetermined condition, wherein the second space and the first space are independent of each other, and the predetermined condition comprises the size of the residual space of the second space is greater than or equal to a size of the target object; and in a case that a privacy key is set for the second space, the second space is enabled; wherein the program, when executed by the processor of the electronic device, causes the electronic device to further perform:

encrypting the target object in a target encryption manner matched with an object type of the target object; and moving the encrypted target object into the second space, and deleting unencrypted target object in the first space; and the program, when executed by the processor of the electronic device, causes the electronic device to further perform:

encrypting a full text of the target object in a case that a size of content of the target object is less than or equal to a preset quantity of bytes; or encrypting a first preset quantity of bytes of the target object in a case that the size of the content of the target object is greater than the preset quantity of bytes.

13. The non-transitory readable storage medium according to claim 12, wherein the program, when executed by the processor of the electronic device, causes the electronic device to further perform:

receiving the first input of the user in a case that the second space is not enabled, wherein the first input is further used to enable the second space.

14. The non-transitory readable storage medium according to claim 12, wherein the program, when executed by the processor of the electronic device, causes the electronic device to further perform:

clearing all background application data in the second space in a case that the second space is exited; or in a case that a first application in the second space runs in a background, performing fuzzy processing on the first application in the background; or in a case that a first application in the second space is not enabled, setting the first application to a hidden state.

* * * * *